United States Patent [19]
Girard

[11] Patent Number: 6,032,615
[45] Date of Patent: Mar. 7, 2000

[54] AMUSEMENT DEVICE FOR HOUSEHOLD PETS, SUCH AS CATS

[75] Inventor: Alan Michael Girard, Brunswick, Ohio

[73] Assignee: Virtu Company, Fairport Harbor, Ohio

[21] Appl. No.: 09/005,178

[22] Filed: Jan. 9, 1998

[51] Int. Cl.[7] .................................................. A01K 29/00
[52] U.S. Cl. .......................................... 119/707; 446/489
[58] Field of Search ..................................... 119/702, 708, 119/707, 711; 446/227, 168, 486, 489, 491; 273/138.3, 142 E, 142 F, 142 G, 142 H, 459

[56] References Cited

U.S. PATENT DOCUMENTS

| | | | |
|---|---|---|---|
| 547,764 | 10/1895 | Boyum | 446/256 |
| 1,384,334 | 7/1921 | Pitoni | 446/168 |
| 2,662,336 | 12/1953 | Zalkind | 446/170 |
| 3,599,978 | 8/1971 | Sondergaard | 273/138.3 |
| 3,648,403 | 3/1972 | Gommel | 446/491 |
| 3,814,432 | 6/1974 | Rose | 273/123 R |
| 4,722,299 | 2/1988 | Mohr | 119/707 |
| 5,009,193 | 4/1991 | Gordon | 119/711 |
| 5,269,261 | 12/1993 | McCance | 119/706 |
| 5,351,650 | 10/1994 | Graves | 119/707 |
| 5,360,214 | 11/1994 | Harmen | 273/142 E X |
| 5,572,955 | 11/1996 | Boshears | 119/706 |
| 5,579,725 | 12/1996 | Boshears | 119/706 |
| 5,632,490 | 5/1997 | Brown | 273/350 |
| 5,673,652 | 10/1997 | Witte | 119/707 |

OTHER PUBLICATIONS

Animail Pet Care Products Brochure—"New Ideas for Pets and People"—Publication Date Unknown.

*Primary Examiner*—Michael J. Carone
*Assistant Examiner*—James S. Bergin
*Attorney, Agent, or Firm*—Oldham & Oldham Co., L.P.A.

[57] ABSTRACT

An outer housing preferably fabricated from a transparent or translucent plastic material, the outer housing including a central connecting portion and three outwardly extending arms. Slots are provided in the top and the sides of the three outwardly extending arms to permit a household pet, such as a cat, to reach and move one or more balls positioned therein towards the central connecting portion. The bottom surface of the central connecting portion preferably includes an upwardly extending projection, preferably conical in configuration, which, by gravitational force, tends to toll the one or more balls positioned therein into one of the three outwardly extending arms.

20 Claims, 1 Drawing Sheet

AMUSEMENT DEVICE FOR HOUSEHOLD PETS, SUCH AS CATS

BACKGROUND AND SUMMARY OF THE INVENTION

The present invention relates generally to new and novel improvements in an amusement device for household pets, such as cats. More particularly, the present invention relates to an amusement device for household pets, such as cats, which is durable and lightweight, economical to fabricate and requires limited floor space, yet provides household pets, such as cats, with exercise, entertainment and amusement.

Household pets, such as cats, which spend the majority of their time indoors, are becoming increasingly popular. In addition, due to the increasingly busy schedules of their owners, such household pets, such as cats, are spending an increasing amount of time alone indoors when their owners are not present. It is well known that household pets, such as cats, are entertained and amused by moving objects, such as rolling balls and simulated mice. In particular, household pets, such as cats, seem to be particularly attracted to moving objects they can maneuver, such as balls of string and other spherical objects which the household pets, such as cats, can propel across the floor. However, a disadvantage of such free-rolling objects is that they often tend to roll underneath household furniture and appliances, such as refrigerators, couches and bookcases, which makes it difficult for household pets, such as cats, as well as their owners, to retrieve the free-rolling object, with the result that an interesting game is suddenly terminated.

There is also a risk that a household pet, such as a cat, will tire of playing with a free-rolling object and abandon the free-rolling object in the middle of a hallway or a room where it suddenly becomes a hazard to an unsuspecting individual who is walking through the area without paying attention to the abandoned free-rolling object on the floor.

Accordingly, an object of the present invention is the provision of an amusement device for household pets, such as cats, which is durable and lightweight and which requires limited floor space.

A further object of the present invention is the provision of an amusement device for household pets, such as cats, which provides the challenge of a moving object, such as one or more balls, which move in a controlled path and which do not become lost or wedged when in a static condition.

These and other objects of the present invention are attained by an amusement device for household pets, such as cats, which includes an outer housing preferably fabricated from a transparent or translucent plastic material, the outer housing including a central connecting portion and three (3) outwardly extending arms. Slots are provided in the top and the sides of the three (3) outwardly extending arms to permit a household pet, such as a cat, to reach and move one or more balls positioned therein towards the central connecting portion. The bottom surface of the central connecting portion preferably includes an upwardly extending projection, preferably conical in configuration, which, by gravitation force, tends to roll the one or more balls positioned therein into one of the three (3) outwardly extending arms.

DETAILED DESCRIPTION OF THE DRAWINGS

Figure 1:
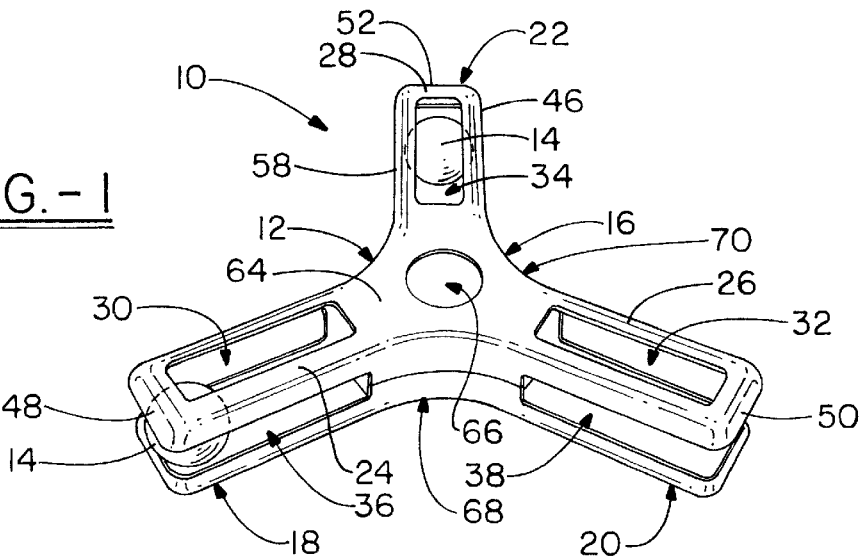
FIG. 1 is a perspective view of an amusement device for household pets, such as cats, in accordance with a preferred embodiment of the present invention.

In the following detailed description of a preferred embodiment of the present invention, reference is made to the accompanying drawings which, in conjunction with this detailed description, illustrate and describe an amusement device for household pets, such as cats, in accordance with the present invention. Referring now to the drawings, in which like-referenced characters indicate corresponding elements throughout the several views, attention is first directed to FIGS. 1 through 3 which illustrate a perspective view, a top view and a side view, respectively, of an amusement device for household pets, such as cats, in accordance with a preferred embodiment of the present invention, generally identified by reference number 10. Amusement device 10 for household pets, such as cats, generally includes outer housing 12, which is preferably fabricated from a durable transparent or translucent plastic material, and one or more balls 14 positioned therein. Outer housing 12 includes central connecting portion 16 and three arms 18, 20 and 22, respectfully, outwardly extending therefrom. Outwardly extending arms 18, 20 and 22 are preferably substantially equally spaced around and outwardly extend from central connecting portion 16.

Figure 2:
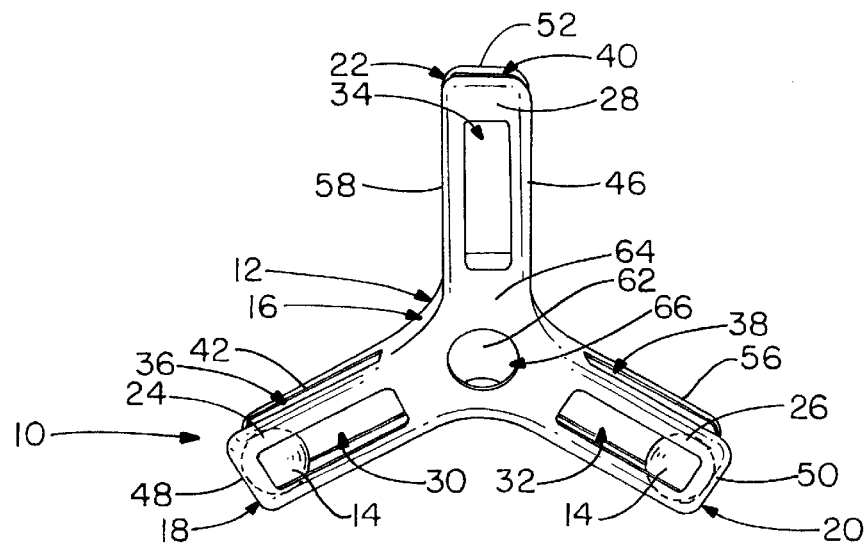
FIG. 2 is a top view of the preferred embodiment of an amusement device for household pets, such as cats, shown in FIG. 1.

As seen in FIG. 2, top surface 24, 26 and 28, respectively, of each outwardly extending arm 18, 20 and 22, includes an opening 30, 32 and 34, respectively, which is preferably substantially rectangular in configuration. In the preferred embodiment of the amusement device 10 for household pets, such as cats, as shown and described herein, openings 30, 32 and 34 have a width which is less than the diameter of one or more balls 14 to prevent one or more balls 14 from exiting therefrom. In addition, referring to FIG. 3, each of outwardly extending arms 18, 20 and 22 includes a slot 36, 38 and 40, respectively, which are preferably of a uniform height and extend from first side 42, 44 and 46, respectively, of outwardly extending arms 18, 20 and 22 around outward end 48, 50 and 52, respectively, of outwardly extending arms 18, 20 and 22 to second side 54, 56 and 58, respectively, of outwardly extending arms 18, 20 and 22. While applicant has found that if a suitable durable plastic material is utilized to fabricate amusement device 10 for household pets, such as cats, slots 36, 38 and 40 can be completely open around the circumference of outwardly extending arms 18, 20 and 22, if desired, supports can be provided near the outward end 48, 50 and 52, respectively, of outwardly extending arms 18, 20 and 22 to maintain the spacing of slots 36, 38 and 40 near outer end 48, 50 and 52, respectively, of outwardly extending arms 18, 20 and 22. As seen in FIG. 2, base portion 60 of outer housing 12 is preferably solid.

Outer housing 12 also preferably includes projection 62 upwardly extending from base portion 60 of outer housing 12. Projection 62 is preferably substantially conical in configuration and gravitational force tends to move one or more balls 14 positioned thereon into one of outwardly extending arms 18, 20 and 22. Top portion 64 of outer housing 12 further preferably includes circular opening 66 in central connecting portion 16 which is preferably slightly larger in diameter than the diameter of one or more balls 14 to permit one or more balls 14 to be placed into and/or removed from the interior of outer housing 12 therethrough.

One or more balls 14 are preferably fabricated from a durable plastic material and are preferably hollow and relatively lightweight. One or more balls 14 are also preferably fabricated from a colorful material to attract the attention of household pets, such as cats. Although a total of two balls 14 are shown in the drawings, it should be appreciated that one or more than two balls could be placed in the interior of outer housing 12 through circular opening 66 as desired.

Figure 3:
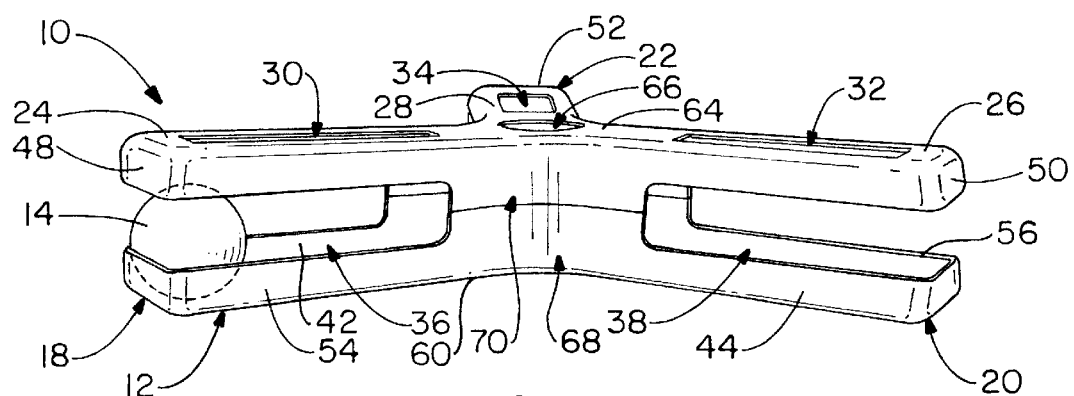
FIG. 3 is a side view of the preferred embodiment of an amusement device for household pets, such as cats, shown in FIG. 1.

As seen in FIG. 3, outer housing 12 is preferably fabricated by joining lower portion 68 and upper portion 70 together along a substantially horizontal line by using, for example, an adhesive, plastic "welding," or some other plastic joining process. Lower portion 68 and upper portion 70 are preferably fabricated using conventional plastic forming or molding processes.

Accordingly, although the present invention has been described above in detail, the same is by way of illustration and example only and is not to be taken as a limitation on the present invention. For example, amusement device 10 for household pets, such as cats, could have fewer or more than the three outwardly extending arms 18, 20 and 22 shown and described herein. In addition, amusement device 10 for household pets, such as cats, in accordance with the present invention could be readily modified in various ways. Accordingly, the scope and content of the present invention are to be defined only by the terms of the appended claims.

What is claimed is:

1. An amusement device for household pets, such as cats, comprising:

an outer housing having a central connecting portion, a plurality of arms outwardly extending therefrom, each of said plurality of outwardly extending arms being hollow and having an outward end to form an enclosed channel therein and a base portion which is substantially flat, said base portion rests directly upon a supporting surface; and at least one ball positioned in at least one of the enclosed channels in said outwardly extending arms, said at least one ball being movable within the enclosed channels in said outwardly extending arms.

2. The amusement device for household pets, such as cats, in accordance with claim 1, wherein each of said plurality of outwardly extending arms includes a top surface, a first side surface and a second side surface and at least one of said top surface, said first side surface, said second side surface and said outward end of said plurality of outwardly extending arms includes an opening which permits access to said at least one ball positioned therein.

3. The amusement device for household pets, such as cats, in accordance with claim 2, wherein said central connecting portion of said outer housing includes a base portion having a projection upwardly extending therefrom, said projection facilitating rolling of said at least one ball positioned therein into one of said plurality of outwardly extending arms by gravitational force.

4. The amusement device for household pets, such as cats, in accordance with claim 3, wherein said central connecting portion of said outer housing includes a top surface having a circular opening therein which permits said at least one ball to pass therethrough.

5. The amusement device for household pets, such as cats, in accordance with claim 4, wherein said plurality of outwardly extending arms are substantially equidistantly positioned around the circumference of said central connecting portion.

6. The amusement device for household pets, such as cats, in accordance with claim 1, wherein each of said plurality of outwardly extending arms includes a top surface, a first side surface and a second side surface and each of said top surface, said first side surface, said second side surface and said outward end of said plurality of outwardly extending arms includes an opening which permits access to said at least one ball positioned therein.

7. The amusement device for household pets, such as cats, in accordance with claim 1, wherein said central connecting portion of said outer housing includes a bottom surface having a projection upwardly extending therefrom, said projection facilitating rolling of said at least one ball positioned therein into one of said plurality of outwardly extending arms by gravitational force.

8. The amusement device for household pets, such as cats, in accordance with claim 1, wherein said plurality of outwardly extending arms are substantially equidistantly positioned around the circumference of said central connecting portion.

9. The amusement device for household pets, such as cats, in accordance with claim 1, wherein said outer housing is fabricated from a substantially transparent or translucent material.

10. An amusement device for household pets, such as cats, comprising:

an outer housing having a central connecting portion and a plurality of arms outwardly extending therefrom, each of said plurality of outwardly extending arms being hollow and having an outward end to form an enclosed channel therein, said central connecting portion of said outer housing includes a top surface having a circular opening therein; and at least one ball positioned in at least one of the enclosed channels in said outwardly extending arms, said at least one ball being movable within the enclosed channels in said outwardly extending arms and being capable of passing through said circular opening in said top surface of said outer housing.

11. An amusement device for household pets, such as cats, comprising:

an outer housing having a central connecting portion, a first arm, a second arm and a third arm outwardly extending therefrom, each of said first outwardly extending arm, said second outwardly extending arm and said third outwardly extending arm being hollow and having an outward end to form an enclosed channel therein and a base portion which is substantially flat, said base portion rests directly upon a supporting surface; and at least one ball positioned in at least one of the enclosed channels in said first outwardly extending arm, said second outwardly extending arm and said third outwardly extending arm, said at least one ball being movable within the enclosed channels in said first outwardly extending arm, said second outwardly extending arm and said third outwardly extending arm.

12. The amusement device for household pets, such as cats, in accordance with claim 11, wherein each of said first outwardly extending arm, said second outwardly extending arm and said third outwardly extending arm includes a top surface, a first side surface and a second side surface and at least one of said top surface, said first side surface, said second side surface and said outward end of said at least one of said first outwardly extending arm, said second outwardly extending arm and said third outwardly extending arm includes an opening which permits access to said at least one ball positioned therein.

13. The amusement device for household pets, such as cats, in accordance with claim 12, wherein said central connecting portion of said outer housing includes a base portion having a projection upwardly extending therefrom, said projection facilitating rolling of said at least one ball positioned therein into one of said first outwardly extending arm, said second outwardly extending arm and said third outwardly extending arm by gravitational force.

14. The amusement device for household pets, such as cats, in accordance with claim 13, wherein said central connecting portion of said outer housing includes a top surface having a circular opening therein which permits said at least one ball to pass therethrough.

15. The amusement device for household pets, such as cats, in accordance with claim 14, wherein said first outwardly extending arm, said second outwardly extending arm and said third outwardly extending arm are substantially equidistantly positioned around the circumference of said central connecting portion.

16. The amusement device for household pets, such as cats, in accordance with claim 11, wherein each of said first outwardly extending arm, said second outwardly extending arm and said third outwardly extending arm includes a top surface, a first side surface and a second side surface and each of said top surface, said first side surface, said second side surface and said outward end of said outwardly extending arm includes an opening which permits access to said at least one ball positioned therein.

17. The amusement device for household pets, such as cats, in accordance with claim 11, wherein said central connecting portion of said outer housing includes a bottom surface having a projection upwardly extending therefrom, said projection facilitating rolling of said at least one ball positioned therein into one of said first outwardly extending arm, said second outwardly extending arm and said third outwardly extending arm by gravitational force.

18. The amusement device for household pets, such as cats, in accordance with claim 11, wherein said central connecting portion of said outer housing includes a top surface having a circular opening therein which permits said at least one ball to pass therethrough.

19. The amusement device for household pets, such as cats, in accordance with claim 11, wherein said first outwardly extending arm, said second outwardly extending arm and said third outwardly extending arm are substantially equidistantly positioned around the circumference of said central connecting portion.

20. The amusement device for household pets, such as cats, in accordance with claim 11, wherein said outer housing is fabricated from a substantially transparent or translucent material.

* * * * *